US009338758B2

(12) United States Patent
Yang et al.

(10) Patent No.: US 9,338,758 B2
(45) Date of Patent: May 10, 2016

(54) METHOD AND APPARATUS FOR DETECTING TIMING ADVANCE GROUP CHANGES OF CELLS

(75) Inventors: Tao Yang, Shanghai (CN); Seau Sian Lim, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 75 days.

(21) Appl. No.: 14/238,396

(22) PCT Filed: Jul. 31, 2012

(86) PCT No.: PCT/IB2012/001566
§ 371 (c)(1),
(2), (4) Date: Feb. 11, 2014

(87) PCT Pub. No.: WO2013/024332
PCT Pub. Date: Feb. 21, 2013

(65) Prior Publication Data
US 2014/0192798 A1    Jul. 10, 2014

(30) Foreign Application Priority Data
Aug. 12, 2011    (CN) .......................... 2011 1 0233627

(51) Int. Cl.
*H04W 4/00*    (2009.01)
*H04W 56/00*    (2009.01)

(52) U.S. Cl.
CPC ...... *H04W 56/0055* (2013.01); *H04W 56/0045* (2013.01)

(58) Field of Classification Search
None
See application file for complete search history.

(56) References Cited

U.S. PATENT DOCUMENTS

| 6,047,181 A | 4/2000 | Suonvieri | |
| 6,982,993 B1 * | 1/2006 | Claveloux et al. | 370/503 |
| 2003/0119524 A1 | 6/2003 | Carlsson | |
| 2006/0227718 A1 * | 10/2006 | Wang et al. | 370/252 |
| 2010/0120443 A1 * | 5/2010 | Ren | 455/450 |
| 2011/0085491 A1 | 4/2011 | Tynderfeldt et al. | |

FOREIGN PATENT DOCUMENTS

CN    101925156 A    12/2010
WO    WO 2008/136488 A1    11/2008

(Continued)

OTHER PUBLICATIONS

LTE World, Timing Advance (TA) in LTE, Sep. 1, 2010, all.*

(Continued)

*Primary Examiner* — Omar Ghowrwal
*Assistant Examiner* — Angel Brockman
(74) *Attorney, Agent, or Firm* — Fay Sharpe LLP

(57) ABSTRACT

The present invention provides a method and an apparatus of detecting a timing advance group change of a cell, wherein the method comprises: judging whether a timing advance value of at least one cell in the timing advance group is invalid; and determining that the timing advance group of the at least one cell changes based on the judgment that the timing advance value is invalid. According to the method and apparatus of the present invention, whether the timing advance group of the cell changes can be detected by judging whether the timing advance value of the cell is invalid, and after the timing advance group is detected to have changed, updating of the timing advance value and timing advance group of the cell in which the timing change happens is implemented.

15 Claims, 3 Drawing Sheets

(56) References Cited

FOREIGN PATENT DOCUMENTS

| WO | WO 2011/026377 A1 | 3/2011 |
|---|---|---|
| WO | 2013/113146 A1 | 8/2013 |

OTHER PUBLICATIONS

3GPP, 3GPP Technical Specification Group Radio Access Network Physical Layer Procedures (TDD), 1999, 3GTS 25.224 V3.2.0. all.*
E-Mail Rapporteur (NTT Docomo, Inc.), "CA support for multi-TA," 3GPP TSG-RAN2#69, Feb. 22-26, 2010, San Francisco, U.S.A, R2-101567, Document for: Discussion and decision, Agenda Item: 7.1.1, 12 pages.
International Search Report for PCT/IB2012/001566 dated Jan. 17, 2013.
Qualcomm Incorporated, "Supporting multiple timing advance groups," 3GPP TSG-RAN WG2 meeting#68bis, Valencia, Spain, Jan. 18-22, 2010, Agenda Item: 7.1.1, Document for: Discussion and decision, R2-100423, 5 pages.
Renesas Electronics Europe, "Discussion on Multiple Timing Advance," 3GPP TSG-RAN WG2 Meeting #73bis, Shanghai, China, Apr. 11-15, 2011, Agenda Item: 7.1, Document for: Discussion, R2-111982, 7 pages.
ZTE, "Group Model in Multiple TA," 3GPP TSG-RAN WG2 Meeting #74, Barcelona, Spain, May 9-13, 2011, Agenda item: 7.1, Document for: Discussion and Decision, R2-112876, 3 pages.
Huawei, Hisilicon, "Discussion on TA group management," 3GPP TSG-RAN WG2 Meeting #74, Barcelona, Spain, May 9-13, 2011, Agenda item: 7.1.1, Document for: Discussion and Decision, R2-113285, 4 pages.

* cited by examiner

METHOD AND APPARATUS FOR DETECTING TIMING ADVANCE GROUP CHANGES OF CELLS

FIELD OF THE INVENTION

Embodiments of the present invention generally relate to wireless communications, and more particularly, to a method and an apparatus for detecting a Timing Advance (abbreviated as "TA") group change of a cell.

BACKGROUND OF THE INVENTION

In order to improve a peak rate, achieve compatibility to a LET system and make full use of spectrum resources, current LTE-A (Long Term Evolution-Advanced) introduces a carrier aggregation technology. In a system introduced with the carrier aggregation, an uplink and a downlink of a user equipment (UE) can communicate with base stations (also called BS or eNodeB) through a plurality of cells having a plurality of component carriers (CC). Generally, the plurality of cells where the UE works comprise a primary cell ("Pcell" for short) and a plurality of secondary cells ("Scell" for short). With respect to one UE, if the base station determines that certain cells can share one TA value, these cells can be classified into one TA group.

FIG. 1 schematically illustrates a scenario of a wireless communication system utilizing the above carrier aggregation technology. As shown in FIG. 1, the base station supports two frequency bands (or cells) F1 and F2, wherein F1 cell provides large coverage scope and is assumed as a primary cell whereas F2 cell provides small coverage scope and assumed as a secondary cell. The coverage scope of the F2 cell can be expanded by a frequency selective repeater.

In this scenario, when the UE is located in a region jointly covered by the F1 cell and F2 cell and being close to the base station, it can be considered that the F1 and F2 cells use the same TA value, so the F1 cell and F2 cell belong to the same TA group. When the UE moves far away from the base station, and is located in coverage scope of the repeater, the F1 cell and the F2 cell can be aggregated. However, since a distance of the UE from the base station is distinct from a distance of the UE from the repeater, the uplink TA values of the F1 cell and F2 cell are different so that the F1 cell and F2 cell will belong to different TA groups.

In the foregoing exemplary scenario, due to constant movement of the UE or other causes, the current secondary cell of the UE might belong to different TA groups so that the UE uses different new TA values, which inevitably involves the issue of a TA group change. How to detect such a TA group change and subsequently support such a TA group change is a problem that needs to be solved in the art.

SUMMARY OF THE INVENTION

An object of the present invention is to address the above technical problems and provide a method and an apparatus for detecting a timing advance group change of a cell so as to effectively detect the change of the timing advance group of the cell and provide a good subsequent support for the change of the timing advance group.

In order to achieve the above object of the present invention, according to one aspect of the present invention, there is provided a method of detecting a timing advance group change of a cell, comprising: judging whether a timing advance value of at least one cell in the timing advance group is invalid; and determining that the timing advance group of the at least one cell changes based on the judgment that the timing advance value is invalid.

In one embodiment, the judging whether a timing advance value of at least one cell is invalid comprises judging whether the timing advance value of the at least one cell is invalid based on information for determining whether the timing advance value changes.

In one embodiment, the information for determining whether the timing advance value changes comprises at least one of the following: an uplink transmission loss rate of a user equipment in the at least one cell determined at the base station; downlink cell reference signal quality reports of different frequencies received from the user equipment; and receiving time difference reports of the downlink cell reference signals of different frequencies received from the user equipment.

In a further embodiment, the judging whether a timing advance value of the at least one cell is invalid comprises receiving an indication from the user equipment judging that the timing advance value of the at least one cell is already invalid.

In another embodiment, when the cell is a primary cell, the method further comprises performing one of the following operations in response to the determining that the timing advance group of the primary cell changes: triggering the primary cell change procedure by a switching or non-switching procedure; and triggering a physical random access channel procedure on the primary cell to obtain a new timing advance value.

In one embodiment, the cell is a secondary cell and the method further comprises performing one of the following operations in response to the determining that the timing advance group of the secondary cell changes: releasing the current secondary cell and configuring a new secondary cell at the same frequency as the current secondary cell; configuring the current secondary cell with a new timing advance group indication information; and triggering a physical random access channel procedure on the secondary cell to obtain a new timing advance value.

In a further embodiment, the releasing the current secondary cell and configuring a new secondary cell at the same frequency as the current secondary cell comprises: determining whether the new timing advance group to which the new secondary cell belongs has a valid timing advance value; activating the new secondary cell in response to determining that the new timing advance group has the valid timing advance value; and in response to determining that the new timing advance group has no valid timing advance value, activating the new secondary cell and triggering a physical random access channel procedure on the new secondary cell to obtain a new timing advance value.

In an embodiment, the configuring the current secondary cell with a new timing advance group indication information comprises: determining whether the new timing advance group to which the current secondary cell belongs has a valid timing advance value; indicating the user equipment to perform uplink transmission with the valid timing advance value in response to determining that the new timing advance group has the valid timing advance value; and in response to determining that the new timing advance group has no valid timing advance value, indicating the user equipment to stop the uplink transmission until triggering the physical random access channel procedure on the current secondary cell to obtain a new timing advance value.

In another embodiment, the triggering a physical random access channel procedure on the secondary cell to obtain a new timing advance value comprises: determining whether the new timing advance value is the same as the timing advance value of an existing timing advance group; in response to determining that the new timing advance value is the same as the timing advance value of the existing timing advance group, reconfiguring the secondary cell into the existing timing advance group; and in response to determining that the new timing advance value is different from the timing advance value of the existing timing advance group, setting up a new timing advance group based on the new timing advance value and reconfiguring the secondary cell into the new timing advance group.

According to another aspect of the present invention, there is provided an apparatus for detecting a timing advance group change of a cell, comprising: a judging module configured to judge whether a timing advance value of at least one cell in the timing advance group is invalid; and a determining module configured to determine that the timing advance group of the at least one cell changes based on the judgment that the timing advance value is invalid.

According to a further aspect of the present invention, there are provided a base station and user equipment for wireless communications, comprising the above apparatus.

According to the method and apparatus of the present invention, the timing advance group change of a cell can be detected by determining whether the timing advance value of the cell is invalid, and after the timing advance group is detected to have changed, updating of the timing advance value and timing advance group of the cell in which timing change happens is implemented by the above plurality of steps and modules.

BRIEF DESCRIPTION OF THE DRAWINGS

Features, advantages and other aspects of embodiments of the present invention will become more apparent in combination with drawings and with reference to the following detailed description. In the figures, FIG. 1 schematically illustrates a scenario of a wireless communication system utilizing the carrier aggregation technology, wherein a number of embodiments of the present invention can be applied to the scenario.

DETAILED DESCRIPTION OF EMBODIMENTS

Embodiments of the present invention determine, by means of determining whether a current TA value of a cell belonging to a TA group is invalid, whether the TA group change of the cell occurs, namely, whether the cell already no longer belongs to the current TA group. In some embodiments, whether a current timing value of the cell is invalid is determined by a base station based on information for determining whether the TA value changes. In some other embodiments, a user equipment provides the information for determining whether the TA value changes to the base station and the base station makes the above determination, or the user equipment directly provides the base station with a determining indication indicative of whether the TA value changes. After the TA group of the cell is detected or determined as having changed, a number of embodiments of the present invention additionally provide subsequent corresponding processing performed respectively with respect to TA changes of a primary cell TA group and a secondary cell TA group.

Embodiments of the present invention are described in detail with reference to the figures.

Figure 1:
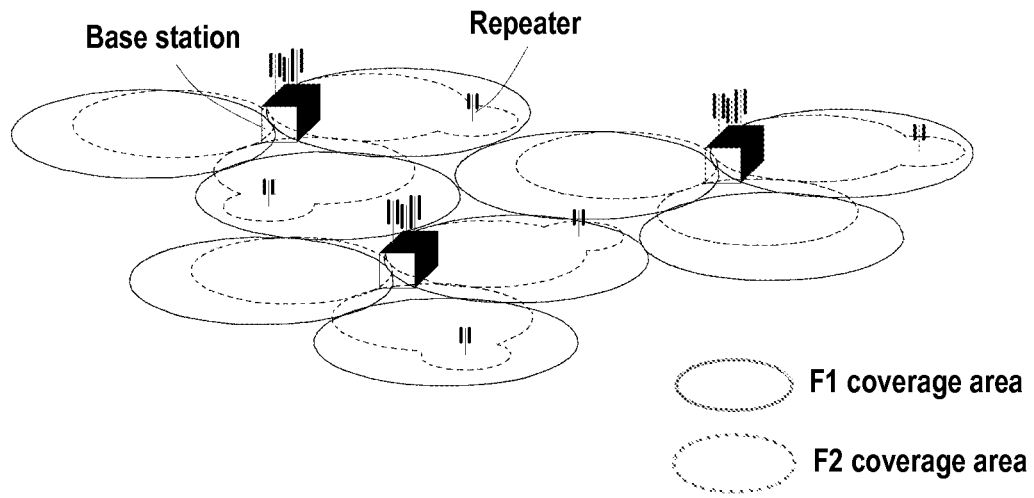

FIG. 1 schematically illustrates a scenario of a wireless communication system utilizing the carrier aggregation technology, wherein a number of embodiments of the present invention may be applied to the scenario. Since the Background of the Invention has already given a rough description in this regard, no further description will be given here.

Figure 2:
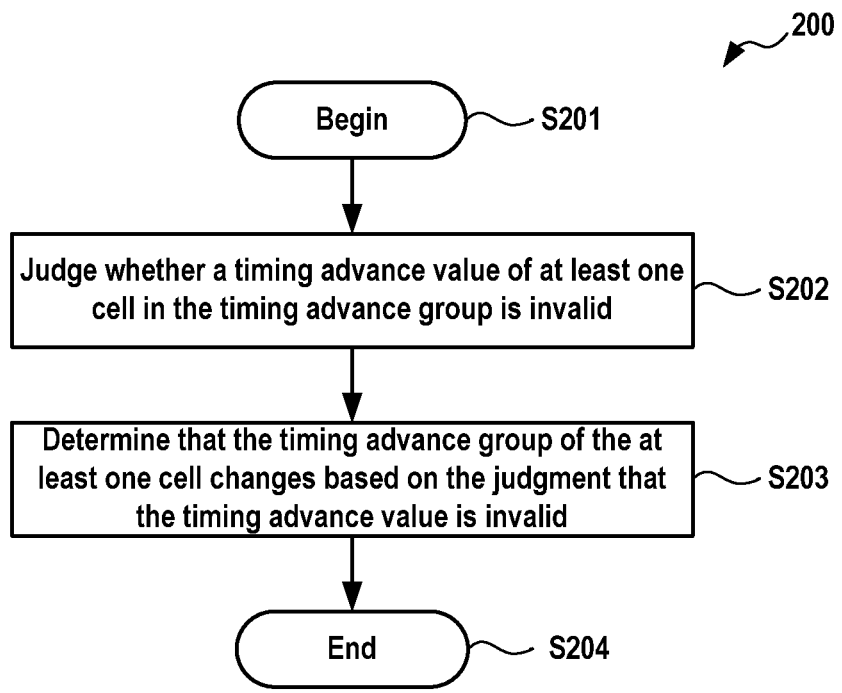
FIG. 2 schematically illustrates a flow chart of a method for detecting a TA group change of a cell according to one embodiment of the present invention.

FIG. 2 schematically illustrates a flow chart of a method 200 for detecting a TA group change of a cell according to one embodiment of the present invention. The method 200 begins with step S201 and proceeds to step S202. At step S202, the method 200 judges whether a TA value of at least one cell in the TA group is invalid. Then, the method 200 proceeds to step S203 where it determines that the TA group of the at least one cell changes based on the judgment that the TA value is invalid. Finally, the method 200 ends at step S204. With the method 200, whether the TA group of the cell, at which the user equipment is currently located, changes can be detected at the base station or the user equipment.

Figure 3:
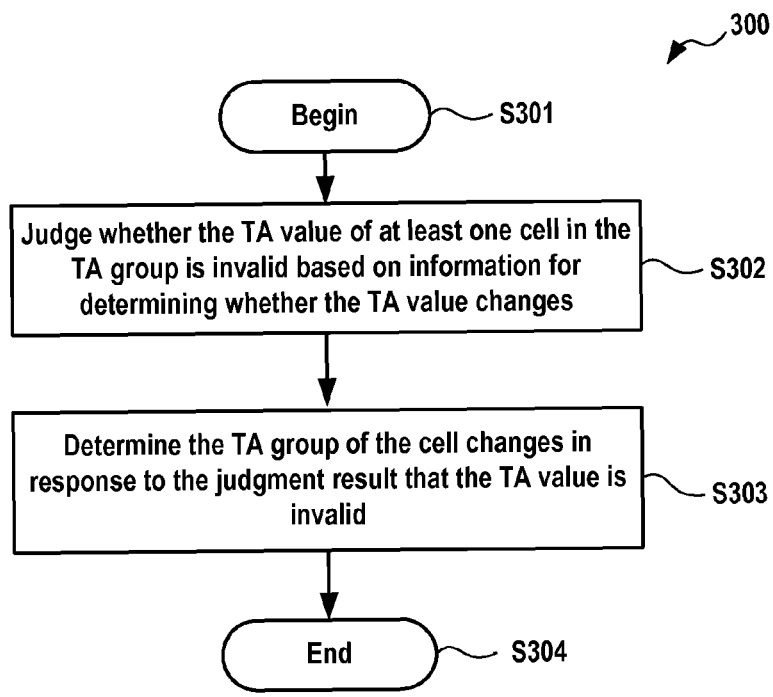
FIG. 3 schematically illustrates a flow chart of a method for detecting a TA group change of a cell according to another embodiment of the present invention.

FIG. 3 schematically illustrates a flow chart of a method 300 for detecting a TA group change of a cell according to another embodiment of the present invention. The method 300 begins with step S301 and proceeds to step S302. At step S302, the method 300 determines whether the TA value of at least one cell in the TA group is invalid based on the information for determining whether the TA value changes.

In one embodiment, the information for determining whether the TA value changes can be information obtained by the base station itself, for example, the base station can determine whether the TA value of the cell where the current UE works changes by detecting a loss rate of uplink transmission of the UE. When the UE substantially changes in respect of transmission delay and causes loss of the uplink transmission, the base station can detect this situation. If the loss of the UE uplink transmission happens a sequential number of times in a predetermined period of time, the base station can determine that the TA value of the cell currently serving the UE has changed, i.e., detect that the TA group change occur at the current cell, and the TA value has already got invalid. In this embodiment, the base station is only aware that the current TA value of the cell serving the UE is not valid any more or already invalid, but it is not aware of a location of the UE. Therefore, the base station cannot ascertain whether the TA group of the cell where the UE is currently located belongs to a new TA group or the already existing TA group. In another embodiment, the information for determining whether the TA value changes can be information received by a UE in the secondary cell.

In an embodiment, the information received by a UE in the secondary cell can be downlink cell reference signals ("CRSs" for short) at different frequencies measured by the UE and reported to the base station, and then the base station, without defining a new UE act, can determine, based on the reference signals, whether the UE is located at a certain position or in certain coverage scope, for example, the coverage scope of the repeater as described in connection with FIG. 1.

Take the scenario shown in FIG. 1 as an example, when the UE is close to the base station but outside the coverage scope of the repeater, the CRSs measured on both of the cells F1 and F2 are of good quality (e.g., over a certain predetermined quality threshold) and the measurement values might be similar. When the UE is far away from the base station and located in the coverage scope of the repeater, the CRS measured on the F1 cell is of poor quality (e.g., below a certain predetermined threshold) whereas the CRS measured on the F2 cell is still of good quality because the CRS measured on the F2 cell is forwarded by the repeater. At this time, the base station can determine that the F1 cell and F2 cell should belong to different TA groups and thus detect an occurrence of a TA group change of the cell.

In an embodiment, the information received by the UE in the secondary cell can be a downlink CRS receiving time difference measured by the UE and reported to the base station. In this embodiment, the UE can determine the downlink CRS receiving time differences at different frequencies and report them to the base station. If the downlink CRS receiving time difference is relatively small, the base station can determine that these frequencies have similar wireless paths and therefore belong to the same TA group. However, if the downlink CRS receiving time difference is relatively large (e.g., over a certain predetermined threshold), the base station can determine that these frequencies (e.g., F1 and F2 in FIG. 1) should belong to different TA groups and thus determine the TA group of the cell changes. In this embodiment, the base station knows the location of the UE and therefore can determine whether the TA group of the cell where the UE is currently located belongs to a new TA group or an already existing TA group.

In the above embodiment wherein the information received by the UE in the secondary cell is used to determine whether the TA value changes, if the base station already knows the location of the UE, it can determine whether the corresponding TA group should belong to a new TA group or an already existing TA group.

In another embodiment, determining whether the timing advance value of at least one cell is invalid comprises receiving, from the UE, an indication of determining that the timing advance value of the at least one cell is already invalid. For example, the UE can send to the base station an indication about the uplink transmission loss rate or an indication about the cell downlink timing change. In particular, the UE can, upon not receiving an ACK/NACK for the uplink transmission (a physical downlink control channel PDCCH can still be received by the UE), detect the loss of the uplink transmission, or the UE can detect a sudden change between the receiving time of old and new downlinks of the primary cell or the secondary cell. For example, the detection can be made based on whether the number of ACK/NACK lost in a predetermined period of time exceeds a predetermined threshold. If the number of the lost ACK/NACK exceeds the predetermined threshold, the UE can draw a conclusion that the TA value has already changed. Based on the above detection, the UE can report the information indicative of an occurrence of the change to the base station so that the base station performs subsequent TA group updating processing, as will be described in detail later.

Turning back to FIG. 3, upon completion of step S302, at step S303, the method 300 determines the TA group change of the cell in response to the determined result that the TA value is invalid. Finally, the method 300 ends at step S304.

After a number of embodiments of detecting the TA group change of the cell according to the present invention are already described with reference to FIG. 1 to FIG. 3, discussion will be made on how to perform the TA group updating processing after determining that the TA value is invalid and thus determining the TA group change. As stated above, upon an occurrence of the change of the TA value of the TA group, the base station would be confronted with the following two possible situations:

Situation 1: the base station determines that the TA value is changed but it cannot determine the location of the UE. Situation 2: when the TA value is becoming invalid, the base station can determine the location of the UE. The two situations will occur for both of the primary cell TA group and secondary cell TA group. In the following, methods that would be implemented separately when the TA changes of the primary cell TA group and secondary cell TA group occur will be described with reference to FIG. 4 and FIG. 5.

Figure 4:
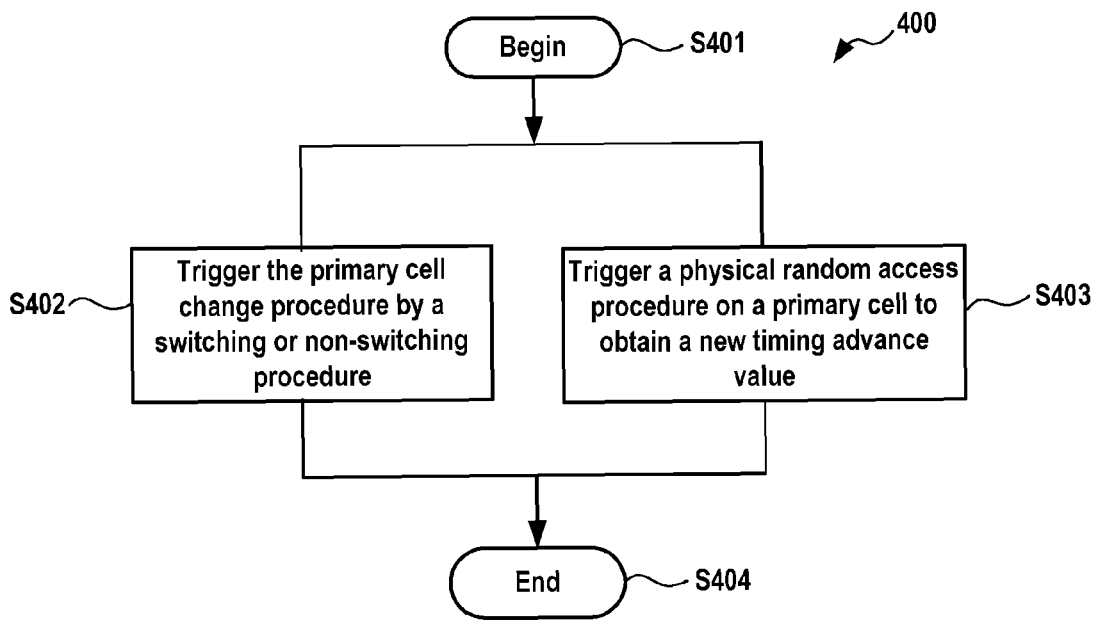
FIG. 4 schematically illustrates a flow chart of a method as performed when a TA group in a primary cell changes according to one embodiment of the present invention.

FIG. 4 schematically illustrates a flow chart of a method 400 that may be implemented when the TA change occurs in the primary cell TA group according to one embodiment of the present invention. Here, the change of the primary cell TA value means that the current primary cell will not serve the UE any more. As shown in the figure, the method 400 begins with step S401 and at step S402, the primary cell change procedure is triggered by a switching or non-switching procedure. Alternatively, at step S403, a physical random access procedure is triggered on the primary cell to obtain a new timing advance value. Then the method 400 ends at step S404.

Regarding the switching procedure in step S402, it can serve as a new mode of the base station triggering the primary cell to change. When the primary cell change is triggered by switching, loss of data might be caused, and all the secondary cells need to be reconfigured. Regarding the non-switching procedure in step S402, the base station can configure a new cell as the primary cell and therefore configure for the UE the corresponding primary cell-related resources including resources such as a physical uplink control channel (PUCCH) and semi-persistent scheduling (SPS). The new cell can be an already existing cell or a newly-configured cell.

Regarding step S403, when the base station detects that the primary cell TA group changes, the base station or the UE can trigger a physical random access channel (PRACH) on the primary cell so as to achieve time alignment of the uplink again and obtain a new TA value. Here, the operation can be regarded as a new PRACH triggering mechanism. It should be noted that before obtaining the new TA value, the UE should stop uplink operations on all other secondary cells no matter whether their TA values are invalid or not, for example, their SRS configurations are released by a RRC (radio resource control) message, or they are deactivated by a media access control control element (MAC CE) control signaling. After new valid TA is resumed for the primary cell TA group, the base station can re-configure the SRSs or activate them once again. On the other hand, if the execution of step S403 fails, i.e., a new timing advance value is not obtained, step S402 is still be performed finally, so as to re-establish the RRC connection for a new primary cell selection.

Figure 5:
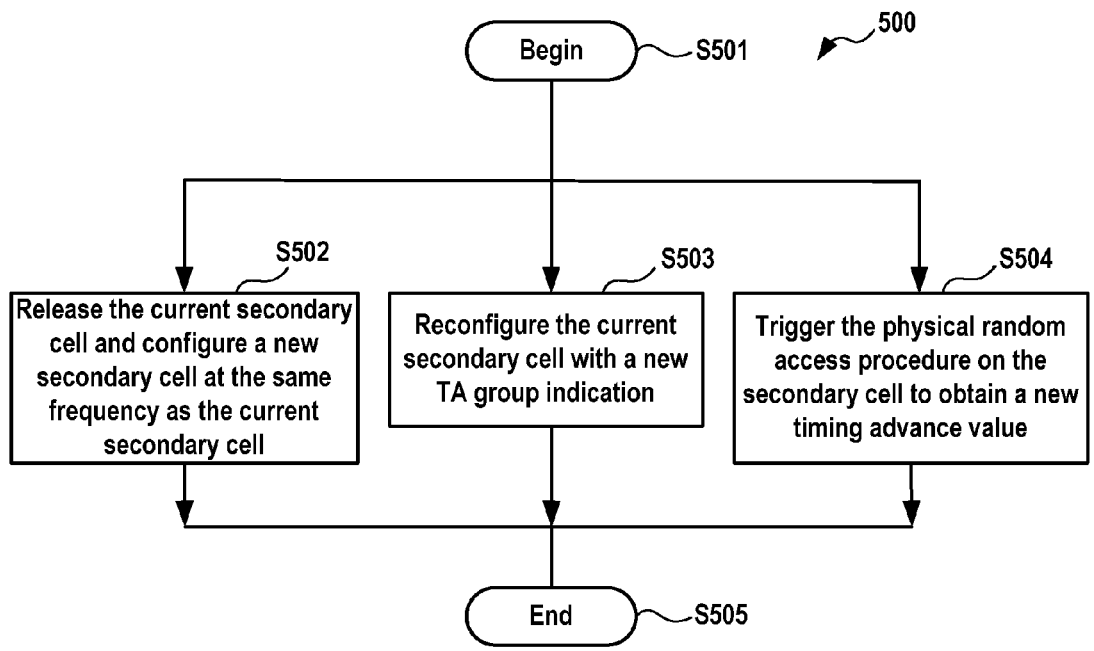
FIG. 5 schematically illustrates a flow chart of a method as performed when a TA group in a secondary cell changes according to another embodiment of the present invention.

FIG. 5 schematically illustrates a flow chart of a method 500 that would be implemented when the TA change occurs in the secondary cell TA group according to another embodiment of the present invention. Here, prior to describing the method 500, it should be emphasized first that, as stated above, the validity of the primary cell TA group will impact operations of all other secondary cell TA groups. Conversely, the validity of the secondary cell TA group will not impact operations of the primary cell group. Also as mentioned above, there are two situations when the secondary cell TA value changes: the base station knows or does not know the position of the UE; that is to say, whether or not the base station has already known the corresponding secondary cell TA group will belong to a new TA group or an existing one.

In view of the above situations, the method 500 begins with step S501, and then deal with the secondary cell TA group updating situation with three different kinds of operations as performed at step S502, S503 or S504 respectively.

At step S502, the method 500 releases the current secondary cell and configures a new secondary cell at the same frequency as the current secondary cell, e.g., this operation may be performed by an RRC message. The performance of this step can disregard whether the base station already knows the position of the UE when the secondary TA group changes.

At step S503, the method 500 reconfigures the current secondary cell with a new TA group indication. When the base station already knows the position of the UE and network deployments, e.g., network frequency information, whether the frequencies are forwarded by the repeater or they directly reach the base station or the like, this step can be performed.

At step S504, the method 500 triggers the physical random access procedure on the secondary cell to obtain a new timing advance value. Similar to step S502, the performance of this step can be regardless of whether the base station already knows the position of the UE.

After performing one of step S502, S503 and S504, the method 500 ends at step S505.

The purposes for updating the secondary cell TA group can be achieved by performing step S502, S503 or S504 in the method 500. However, these steps have different impact on the subsequent operations of the UE, as will be discussed below. Also, there are two kinds of situations after TA group updating if the base station knows the UE position as well as the network deployments:

Situation 1: the secondary cell is changed into a new TA group with a valid TA value; or Situation 2: the secondary cell is changed into a new TA group without a valid TA value.

Taking into account these two situations, the above three steps will have different impact on the UE or base station operations.

First, regarding step S502, at least two RRC messages are needed to implement "TA group" updating. The base station may assign new information to this secondary cell, such as a secondary cell index, carrier indicator field (CIF) information, scheduling scheme and etc.

Also, regardless above two mentioned situations, since the current secondary cell on a specific frequency point is released, all hybrid automatic repeat request (HARQ) procedures on this secondary cell will be impacted, including flushing a HARQ buffer, release of a HARQ process and etc. Then a new HARQ process is established on a new setup secondary cell, even on the same frequency point.

For the new secondary cell being set up, which should be in a de-activated state, regardless above two situations, a MAC CE is needed to activate this new setup secondary cell before it can be used. That means for step S502, the base station needs to activate this new secondary cell before the uplink transmission will take place, and the PRACH procedure does not need to be triggered for the situation 1.

In addition, for the above situation 2 or the base station does not know the UE position when the TA changes, the PRACH procedure should be triggered on this new secondary cell for an uplink time alignment purpose, e.g., the new TA value is obtained either by a MAC CE or PDCCH order. After the new TA is obtained, if this TA value is the same as a value of an existing TA group, the base station will reconfigure this secondary cell into the existing TA group to decrease the number of the maintained TA groups. It should be pointed out that, in the present application, the term "same" expresses not only the meaning of equality but also the meaning of similar or approximate as appropriate, for example, the "same" in the foregoing sentence "this TA value is the same as a value of an existing TA group" can not only express that the two values are completely equal, but also express that the two values can also have certain deviation so long as the deviation is within a tolerable range.

Regarding step S503, as stated above, the step can be performed for the situation that the base station already knows the UE position and network deployments. Hence, after the TA changes, the base station already knows whether the corresponding secondary cell will belong to a new TA group or to an existing TA group. For this step, secondary cell information, such as the secondary cell index, CIF information and etc., needs not to be changed. The only impact is that after TA group changes, the current TA value will be changed into a new one.

For situation 1, subsequent to the TA group change, when a new TA value is already available, no special action will take place if this secondary cell belongs to an existing TA group with valid TA, and the UE can continue its uplink transmission operations based on this new TA value. Under this situation, the secondary cell state will not be impacted; hence there is no impact on its ongoing HARQ procedures. This new TA value can be sent to the UE by the base station explicitly or the UE can take the new TA value automatically.

On the other hand, for situation 2, since no valid TA value is available after the TA group changes, the UE's current uplink transmission on the secondary cell should be stopped, which can be done either by the base station command or by defining new UE automatic behavior.

Regarding it is done by the base station command, the following two schemes can be considered:

Scheme 1: the base station can de-configure SRS on the corresponding secondary cell, and this procedure can be done by an RRC message reconfigured by the secondary cell TA group. Then the base station should re-configure the SRS after a valid TA is achieved. For scheme 1, there is no need to update the secondary cell state. If the secondary cell is active, the base station can trigger PRACH directly after the TA group changes.

Scheme 2: the base station can de-active this secondary cell before sending the secondary cell TA group re-configuration message. For this scheme, after the TA group changes, the base station should first activate this secondary cell and indicate no uplink transmission and then trigger a PRACH procedure. For scheme 2, a new UE operation is defined to discard the current TA value and stop the uplink transmission when receiving the RRC message for reconfiguring the TA group indication but the target TA group does not have a valid TA value. For this scheme, there is no need to update the secondary cell state after the TA group changes. Then the base station can trigger the PRACH procedure by PDCCH order signaling directly if the secondary cell is still active.

Regardless which scheme is used for this situation 2, it is needed to flush all HARQ buffers related to this secondary cell but does not release the related HARQ process.

Regarding step S504, it can be performed when the base station does not know the UE position and/or network deployments. Hence, when the secondary cell group TA is regarded as not valid any more, either UE or the base station will trigger the PRACH procedure to achieve a new TA value. Before a valid TA is achieved, all other secondary cells' operations of this secondary cell TA group should be stopped temporarily as described in step S502.

Also, if this new TA value is the same as another existing secondary cell TA group, the base station can reconfigure each secondary cell in this secondary cell TA group to this existing secondary cell TA group by an RRC message, with the purpose to decrease the number of the maintained TA group. That means that the step S503 will be triggered after the new TA is achieved.

It is made apparent that through the above descriptions of the three steps S502, S503 and S504 of the method 500, steps S502 and S503 are beneficial if the base station already knows the UE position and the deployments. Further, step 502 is beneficial for situation 2 and step 503 needs to define some special rules for this situation. Step S503 is beneficial for situation 1 due to no impact on the secondary cell state and corresponding HARQ procedure. Step 504 can be performed if the base station does not know the UE position or deployments. After the new TA is achieved, step 503 can be triggered to decrease the number of the maintained TA group.

Figure 6:
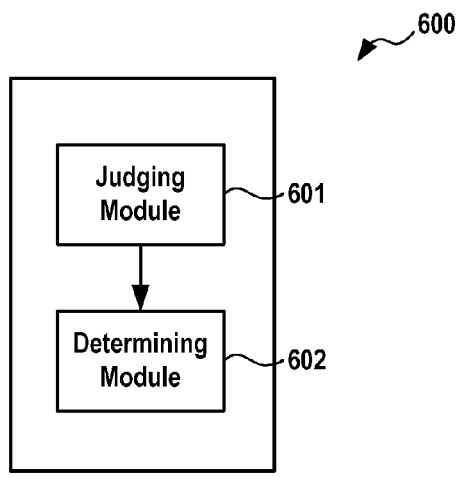
FIG. 6 schematically illustrates a block diagram of an apparatus for detecting a TA group change of a cell according to one embodiment of the present invention.

FIG. 6 schematically illustrates a block diagram of an apparatus 600 for detecting a TA group change of a cell according to one embodiment of the present invention. As shown in FIG. 6, the apparatus 600 comprises a judging module 601 and a determining module 602, wherein the judging module 601 is configured to judge whether a timing advance value of at least one cell in a timing advance group is invalid, and the determining module 602 is configured to determine that the timing advance group of the at least one cell changes based on the judgment that the timing advance value is invalid. Although not shown in FIG. 6, those skilled in the art, according to the depictions of the description, can understand that the apparatus 600 can further comprise corresponding modules configured to perform steps of the above plurality of methods. Furthermore, the apparatus 600 can be included in or implemented in the base station and user equipment for wireless communication and is used to determine whether the TA group of the cell changes and perform the steps of the aforesaid plurality of methods when the TA group of the cell changes to provide a good subsequent support for the TA group updating of the cell.

To sum up, each embodiment of the present invention has been described in detail with reference to the accompanying drawings. Those skilled in the art would appreciate that the embodiments of the present invention may be implemented through hardware, software, firmware, modules or a combination thereof (for example, steps of the method as shown in FIG. 2 may be implemented by modules such as a judger or judging module and a determiner or determining module for implementing the steps), or the present invention may be embodied in a computer program product provided on a signal bearer medium available for any data processing systems.

Such signal bearer medium may be a transmission medium or a recordable medium for computer-readable information, including a magnetic medium, an optical medium, or other suitable medium. Examples of recordable mediums include: a magnetic disk or floppy disk in a hard disk driver, an optical disk for a CD driver, a magnetic tape, and other medium that can be contemplated by the skilled in the art.

It should be noted that in order to make the present invention more comprehensible, the above description omits some more specific technical details which are known to the skilled in the art and may be essential to implement the present invention.

The purpose for providing the description of the present invention is to explain and describe, not to exhaust or limit the present invention within the disclosed form. To a person of normal skill in the art, various modifications and alternations are obvious. Thus, selecting and describing the preferred embodiments is to better illustrate the principle and practical application of the present invention and to enable a person of normal skill in the art to appreciate that without departing the spirit of the present invention, all modifications and alterations fall within the protection scope of the present invention as limited by the appending claims.

What is claimed is:

1. A method of detecting a timing advance group change of a cell, comprising:
   judging whether a timing advance value of at least one cell in the timing advance group is invalid; and
   determining that the timing advance group of the at least one cell changes based on the judgment that the timing advance value is invalid;
   wherein the judging whether a timing advance value of at least one cell is invalid comprises judging whether the timing advance value of the at least one cell is invalid based on information for determining whether the timing advance value changes, and wherein the information comprises at least one of the following:
      an uplink transmission loss rate of a user equipment in the at least one cell determined at the base station; and
      receiving time difference reports of the downlink cell reference signals of different frequencies received from the user equipment.

2. The method according to claim 1, wherein comprises:
   downlink cell reference signal quality reports of different frequencies received from the user equipment.

3. The method according to claim 1, wherein the judging whether a timing advance value of the at least one cell is invalid comprises receiving an indication from the user equipment judging that the timing advance value of the at least one cell is already invalid.

4. The method according to claim 1, wherein the cell is a primary cell, and the method further comprises performing one of the following operations in response to determining that the timing advance group of the primary cell changes:
   triggering the primary cell change procedure by a switching or non-switching procedure; and
   triggering a physical random access channel procedure on the primary cell to obtain a new timing advance value, or
   wherein the cell is a secondary cell, and the method further comprises performing one of the following operations in response to the determining that the timing advance group of the secondary cell changes:
   releasing the current secondary cell and configuring a new secondary cell at the same frequency as the current secondary cell;
   configuring the current secondary cell with a new timing advance group indication information; and
   triggering a physical random access channel procedure on the secondary cell to obtain a new timing advance value.

5. The method according to claim 4, wherein the releasing the current secondary cell and configuring a new secondary cell at the same frequency as the current secondary cell comprises:
   determining whether the new timing advance group to which the new secondary cell belongs has a valid timing advance value;
   activating the new secondary cell in response to determining that the new timing advance group has the valid timing advance value; and
   in response to determining that the new timing advance group has no valid timing advance value, activating the new secondary cell and triggering a physical random access channel procedure on the new secondary cell to obtain a new timing advance value.

6. The method according to claim 4, wherein the configuring the current secondary cell with new timing advance group indication information comprises:
   determining whether the new timing advance group to which the current secondary cell belongs has a valid timing advance value;
   indicating the user equipment to perform uplink transmission with the valid timing advance value in response to determining that the new timing advance group has the valid timing advance value; and
   in response to determining that the new timing advance group has no valid timing advance value, indicating the user equipment to stop the uplink transmission until triggering the physical random access channel procedure on the current secondary cell to obtain a new timing advance value.

7. The method according to claim 4, wherein the triggering a physical random access channel procedure on the secondary cell to obtain a new timing advance value comprises:
   determining whether the new timing advance value is the same as the timing advance value of an existing timing advance group;
   in response to determining that the new timing advance value is the same as the timing advance value of the existing timing advance group, reconfiguring the secondary cell into the existing timing advance group; and
   in response to determining that the new timing advance value is different from the timing advance value of the existing timing advance group, setting up a new timing advance group based on the new timing advance value and reconfiguring the secondary cell into the new timing advance group.

8. An apparatus for detecting a timing advance group change of a cell, comprising:
   a processor comprising:
   a judging module configured to judge whether a timing advance value of at least one cell in the timing advance group is invalid; and
   a determining module configured to determine that the timing advance group of the at least one cell changes based on the judgment that the timing advance value is invalid;
   wherein the judging module comprises a module configured to judge whether the advance value of the at least one cell is invalid based on information for determining whether the timing, advance value changes and wherein the information comprises at least one of the following:
   an uplink transmission loss rate of a user equipment in the at least one cell determined at the base station; and
   receiving time difference reports of the downlink cell reference signal of different frequencies received from the user equipment.

9. The apparatus according to claim 8, wherein the information comprises: downlink cell reference signal quality reports of different frequencies received from the user equipment.

10. The apparatus according to claim 8, wherein the judging module configured to judge whether a timing advance value of the at least one cell is invalid comprises a module configured to receive an indication from the user equipment judging that the timing advance value of the at least one cell is already invalid.

11. The apparatus according to claim 8, wherein the cell is a primary cell, and the apparatus further comprises one of the following modules configured to perform one of the following operations in response to determining that the timing advance group of the primary cell changes:
   a module configured to trigger the primary cell change procedure by a switching or non-switching procedure; and
   a module configured to trigger a physical random access channel procedure on the primary cell to obtain a new timing advance value, or wherein the cell is a secondary cell, and the apparatus further comprises one of the following modules configured to perform one of the following operations in response to the determining that the timing advance group of the secondary cell changes:
   a module configured to release the current secondary cell and configuring a new secondary cell at the same frequency as the current secondary cell;
   a module configured to configure the current secondary cell with a new timing advance group indication information; and
   a module configured to trigger a physical random access channel procedure on the secondary cell to obtain a new timing advance value.

12. The apparatus according to claim 11, wherein the module configured to release the current secondary cell and configure a new secondary cell at the same frequency as the current secondary cell comprises:
   a module configured to determine whether the new timing advance group to which the new secondary cell belongs has a valid timing advance value;
   a module configured to activate the new secondary cell in response to determining that is the new timing advance group has the valid timing advance value; and
   a module configured to activate the new secondary cell and trigger a physical random access channel procedure on the new secondary cell to obtain a new timing advance value, in response to determining that the new timing advance group has no valid timing advance value.

13. The apparatus according to claim 11, wherein the module configured to configure the current secondary cell with new timing advance group indication information comprises:
   a module configured to determine whether the new timing advance group to which the current secondary cell belongs has a valid timing advance value;
   a module configured to indicate the user equipment to perform uplink transmission with the valid timing advance value in response to determining that the new timing advance group has the valid timing advance value; and
   a module configured to indicate the user equipment to stop the uplink transmission until triggering the physical random access channel procedure on the current secondary cell to obtain a new timing advance value, in response to determining that the new timing advance group has no valid timing advance value.

14. A base station for wireless communications, comprising the apparatus according to claim 8.

15. A user equipment for wireless communications, comprising the apparatus according to claim 8.

* * * * *